Sept. 29, 1931. G. J. MEYER 1,825,008
BOTTLE CLEANING APPARATUS
Filed Oct. 18, 1929 2 Sheets-Sheet 1
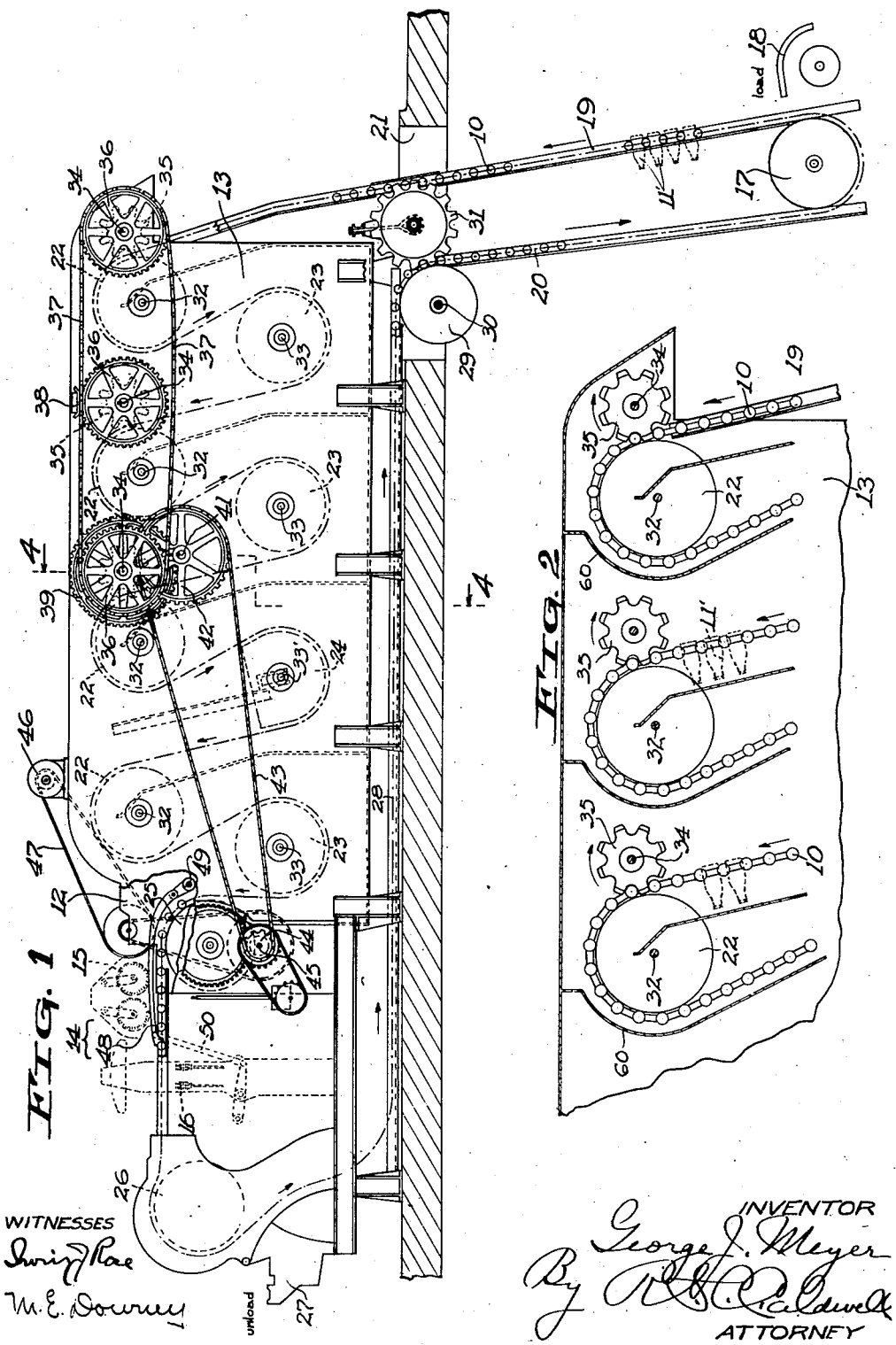
WITNESSES
INVENTOR
George J. Meyer
ATTORNEY Sept. 29, 1931.  G. J. MEYER  1,825,008
BOTTLE CLEANING APPARATUS
Filed Oct. 18, 1929  2 Sheets-Sheet 2

WITNESSES

INVENTOR
George J. Meyer
ATTORNEY

Patented Sept. 29, 1931

1,825,008

UNITED STATES PATENT OFFICE

GEORGE J. MEYER, OF MILWAUKEE, WISCONSIN, ASSIGNOR TO GEO. J. MEYER MANUFACTURING COMPANY, OF CUDAHY, WISCONSIN, A CORPORATION OF WISCONSIN

BOTTLE CLEANING APPARATUS

Application filed October 18, 1929. Serial No. 400,635.

The invention relates to conveyor driving means.

In a bottle cleaning machine embodying a soaking tank through which an endless bottle conveyor passes, it is desirable to provide several soaking compartments in order to obtain efficient soaking action. The bottles, after leaving the soaking tank, are subjected to brushing and rinsing operations, which are conveniently accomplished while the bottle conveyor is momentarily stationary. This requires that the bottle conveyor be given an intermittent motion, a suitable mechanism for producing this intermittent motion being shown in United States Patent No. 1,429,960, issued September 26, 1922, to George J. Meyer, wherein pusher bars periodically advance the conveyor the required distance. In order to lengthen the brushing and rinsing periods, during which the conveyor is stationary, it is desirable to move the conveyor as rapidly as possible from one stop to the next in the cycle of operation. In the case of large bottle cleaning machines, it requires considerable energy to effect the intermittent motion of the bottle conveyor because of the inertia of the long loaded conveyor and because of the friction load.

In order to obviate these difficulties, it is an object of the present invention to provide a conveyor system including an endless bottle conveyor, a relatively small portion of which is driven intermittently through the brushing and rinsing section and the remainder of which is driven continuously, thus substantially reducing the amount of power required to impel the conveyor, minimizing the friction load and eliminating a great deal of wear on the mechanism.

Another object of the invention is to drive the bottle conveyor at a plurality of points to further reduce friction and minimize the strain on the conveyor chain, the slack of the conveyor being deposited at a convenient region for the accommodation of the intermittent drive.

A further object of the invention is to provide a movable guard which controls the slack and prevents the bottles from leaving the conveyor.

The invention further consists in the several features hereinafter set forth and more particularly defined by the annexed claims.

In the accompanying drawings, Fig. 1 is a side view of a bottle cleaning machine embodying the conveyor system of this invention, parts of the machine being broken away and parts being shown in section;

Fig. 2 is a detail sectional elevation of part of the driving means effecting the continuous motion of the conveyor;

Figure 3:
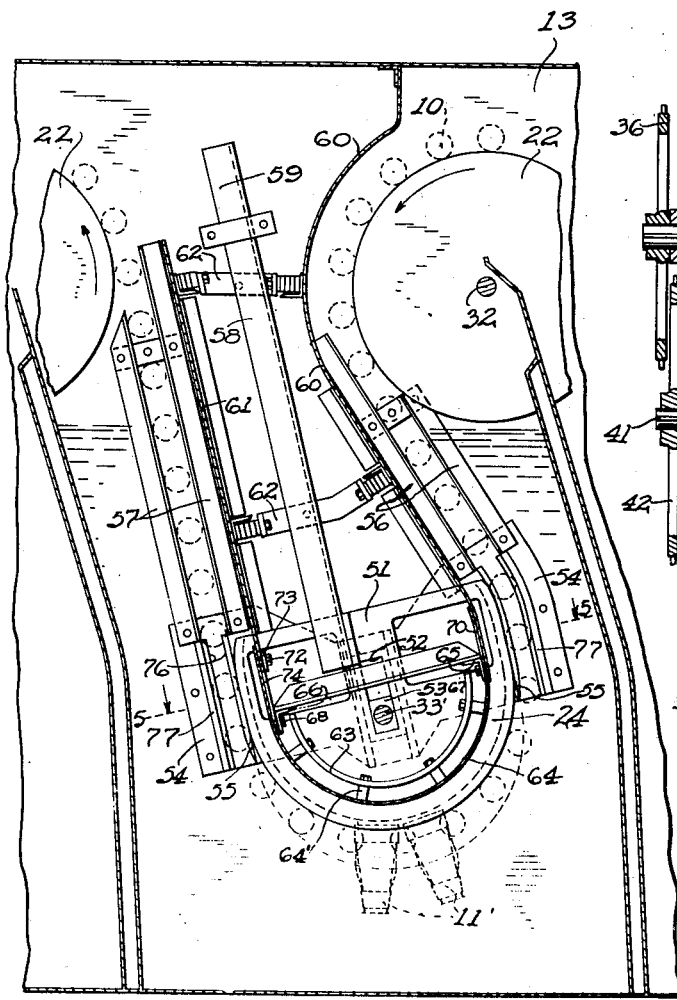
Fig. 3 is a detail sectional elevation taken through one of the soaking compartments, and showing the movable slack-controlling guard.
Figure 4:
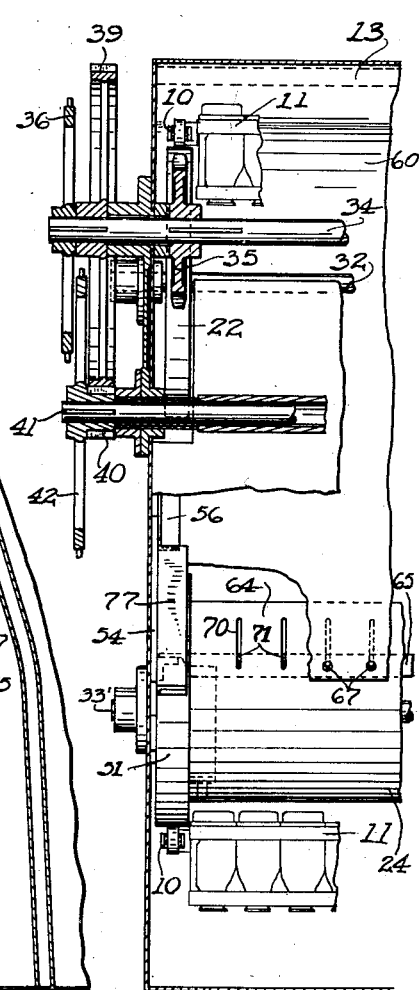
Fig. 4 is a fragmentary transverse sectional elevation of the machine taken on the line 4—4 of Fig. 1.
Figure 5:
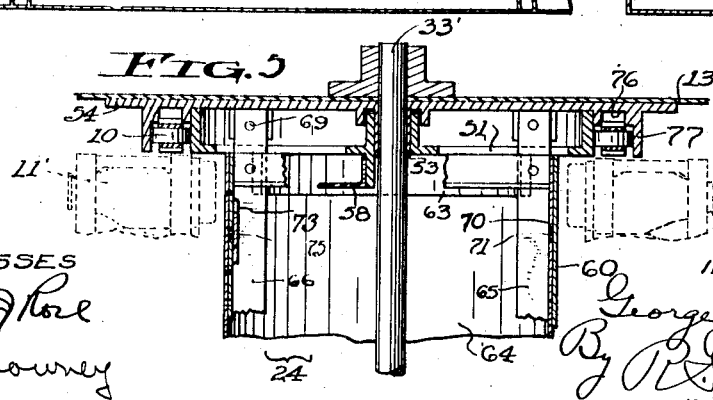
Fig. 5 is a detail sectional elevation taken generally along the line 5—5 of Fig. 3.

In these drawings, the numeral 10 designates a pair of spaced endless conveyor chains of the roller type forming the side portions of a suitable bottle conveyor 11 which is provided with the usual transversely-extending rows of bottle-receiving pockets 11'. The endless bottle conveyor 11 is incorporated in a bottle handling machine 12, here indicated to be a combined soaking and washing machine including a multi-compartment soaking tank 13 and washing mechanism 14, which latter may include rotary brushes 15 for outside brushing and rotary brushes 16 for inside brushing as well as the usual rinsing sprays, not shown.

If desired, the bottle conveyor may be extended to an adjacent floor for loading or unloading purposes, and, in the present instance, adjacent ascending and descending flights are extended to the floor below to pass about a rotary member 17, a bottle-loading device 18 being placed adjacent the lower end of the ascending flight of the conveyor. The ascending and descending flights of the bottle conveyor are respectively guided along suitable tracks 19 and 20, these flights passing through an opening 21 in the floor which supports the bottle cleaning machine. The upper ends of the tracks 19 terminate at the soaking tank adjacent wheels 22 which support the upper end of the ascending conveyor flight, these wheels being rotatable on a horizontal axis. The conveyor chains pass over the wheels 22 and extend downwardly into the first compartment of the soaking tank where they pass under supporting wheels 23 rotatable on a horizontal axis. The conveyor chains extend upwardly from the wheels 23 and thence pass over another pair of supporting wheels 22 to enter downwardly into the next soaking compartment. In this second compartment, the conveyor chains pass under another set of wheels 23 and thence extend upwardly to pass over a third set of wheels 22 and downwardly into the next compartment. In this compartment the chains pass under a movable or "floating" guard 24, hereinafter described, and thence upwardly over a fourth set of wheels 22 from which the chains extend downwardly into the last soaking compartment. In this last compartment, the chains pass under a set of wheels 23 and thence upwardly out of this compartment and over wheels 25, from which the conveyor extends in a horizontal flight past the washing apparatus 14, wherein the bottles in the conveyor are brushed and subjected to rinsing sprays in a well known manner. After leaving the washing apparatus, the conveyor passes over a rotary supporting member 26 and then passes an unloading device 27 of suitable construction where the cleaned bottles are unloaded from the conveyor. The empty conveyor then descends to a pair of tracks 28 along which the conveyor chains are guided for horizontal movement to a pair of guide wheels 29 (one being shown) extending into the floor opening 21 and carried on a shaft 30. The conveyor chains pass over the wheels 29 and then in a descending flight along the tracks 20 heretofore noted. The ascending and descending flights of the conveyor chains extending through the floor opening 21 may be engaged by a pair of adjustably suspended sprocket wheels 31 (one being shown) to support therefrom the weight of the subjacent conveyor and its contents.

The bottle conveyor passes through the multi-compartment soaking tank in a winding or sinuous path in which it is supported on the wheels 22 and 23. Each pair of wheels 22 are carried in spaced relation on a horizontally-extending shaft 32, and each pair of wheels 23 are similarly carried on a horizontally-extending shaft 33. In order to reduce the friction load and to minimize strain on the conveyor chains, that portion of the bottle conveyor within the soaking tank is preferably driven at several points before it reaches the compartment containing the movable guard 24. In the present instance, a plurality of rotatable shafts 34 are carried transversely of the soaking tank in parallel relation to the shafts 32 and each of the shafts 34 carries a pair of sprocket wheels 35 meshing with the upwardly-moving flights of the conveyor chains as they reach the supporting wheels 22. The outer ends of the shafts 34 carry sprockets 36 which mesh with a chain 37 for driving the shafts at the same speed. A guide shoe 38 may be provided for maintaining the chain in mesh with the intermediate sprocket 36. One of the shafts 34, here indicated to be the one nearest the compartment receiving the movable guard 24, is provided with a gear wheel 39 which meshes with a pinion 40 carried on a shaft 41 journalled in the opposite side walls of the soaking tank. The shaft 41 also carries a sprocket wheel 42 which is driven by a chain 43 from a sprocket wheel 44 mounted on a shaft 45. The shaft 45 is driven at a constant speed, through intermediate gearing, by an electric motor 46 or other suitable source of power, the intermediate gearing being here shown to include a belt 47. By this driving connection, the greater part of the endless bottle conveyor, including most of the conveyor within the soaking tank, is continuously driven at a constant speed.

In order to permit the proper operation of the brushing and rinsing mechanism, which may be generally similar to that shown in the above noted United States Patent No. 1,429,960 issued September 26, 1922, to George J. Meyer, it is necessary to provide an intermittent motion for the conveyor. In the present instance, this intermittent motion is confined to a relatively small portion of the conveyor in order to effect economies in power consumption, reduce the friction load and minimize wear on the machine. The impelling mechanism for effecting the intermittent motion of the conveyor past the washing apparatus may be of any suitable character and is here shown to include pusher bars 48 reciprocated by a suitably operated rock shaft 49. Preferably, as in the above patent, the pusher bars are idly reciprocated for all but one of several strokes to restrict the impelling movement of the conveyor to a small part of the cycle of operation, the pusher bars being permitted to periodically engage the chain by suitable linkage 50.

In order to accommodate the rapid intermittent motion of part of the conveyor chain, slack is deposited into one of the soaking compartments near the washing apparatus, this compartment in the present instance being the one in which the movable guard 24 is located. The slack in the conveyor chain is gradually deposited into this compartment by the continuously rotating wheels 22 thereabove, and this slack is periodically taken up with a more rapid movement by the operation of the pusher bars 48. The intermittently travelling conveyor is pulled over the rotary support 26 by the weight of the conveyor hanging therebelow and extending to the horizontal tracks 28. The conveyor is given a continuous travel along the tracks 28, but the slack in the preceding intermittently travelling portion of the conveyor is deposited and taken up in that region between the unloading station 27 and the tracks 28. The continuous and intermittent drives are synchronized by the use of appropriate gearing and the two drives may have a driving element in common, for example, the shaft 45.

As previously noted, slack is deposited into one of the soaking compartments to be periodically taken up by the intermittent drive, this compartment being the one receiving the movable guard 24. The lower end portions of the bight of the conveyor extending into this compartment move up and down during the operation of the bottle washing machine with the result that the bottles have a tendency to leave the conveyor. In order to prevent this, the "floating" guard 24 is movable with the conveyor in its rise and fall. The guard 24 includes a pair of slidably mounted end members 51 disposed near the opposite side walls of the soaking tank and each having a slot 52 receiving a block 53 surrounding a shaft 33' extending transversely of the soaking tank. Guide plates 54 are fixedly secured to the opposite side walls of the soaking tank within the compartment and are each provided with flanges 55 which slidably receive therebetween the end members 51. Spaced angle bars 56 and 57 are fixedly secured to opposite end portions of the guide plates 54 and extend upwardly therefrom to form guide channels between them receiving the rollers of the conveyor chains. The end members 51 are provided with outer side surfaces and lower curved surfaces which form roller-receiving tracks over which the rollers of the conveyor chains pass from the guide angles 56 to the guide angles 57. Each end member 51 has an upstanding bar 58 secured thereto, upper portions of which are slidably mounted in a bracket 59 secured to the side wall of the soaking tank. The end members are thus slidably mounted for raising and lowering movement in the direction of the guide bars.

In the present instance, the bottles enter each soaking compartment in an inclined direction tending to cause the bottles to leave the carriers. In order to retain the bottles in the carriers, a sheet metal guard plate 60 is provided in each compartment along which the bottoms of the bottles may slide. Another guard plate 61 is placed adjacent the flight of the conveyor passing upwardly out of the soaking tank. The guard plates 60 and 61 may be held in place in any suitable manner as by means of adjustable brackets 62 secured to the side walls of the soaking tank.

A semi-circular flange 63 is formed on each end member 51 and has fixedly secured thereto a semi-circular sheet metal guard 64 spaced therefrom by spacers 64' and having its upper ends overlapping the lower ends of the guard plates 60 and 61. The curved plate 64 thus forms in effect a continuation of the guard plates 60 and 61, the overlapping ends being so arranged that the bottles will not become caught on the edges. Angle bars 65 and 66 extend transversely across the lower ends of the guard plates 60 and 61 respectively and are secured thereto by bolts 67 and 68. The ends of the angle bars 65 and 66 are fixedly secured to the guide plates 54 by bolts 69. The upper portions of the curved guard plate 64 adjacent the lower end of the guard plate 60 extend between the lower end of this guard plate and the angle bar 65 and are provided with slots 70 through which the bolts 67 pass. Spacing lugs 71 are secured to the angle bar 65 and extend into the slots 70. The other upper end portions of the curved guard plate 64 are secured by bolts 72 to a transversely-extending bar 73, the guard plate 61 being provided with slots 74 receiving these bolts therethrough. Spacing lugs 75 are secured to the bar 73 and project into the slots 74.

The guide plates 54 are provided with channels 76 within which the outer links of the conveyor chains loosely fit, and are also provided with flanges 77 engageable with the rollers of the chain, the rollers being confined between these flanges and the trackways on the movably mounted end members 51. When the end members are in their lowermost position, a gap exists between these end members and the angle bars 56 and 57 during which time the conveyor chains are guided by the sliding fit of their links in the channels 76.

In operation, the greater part of the bottle conveyor is continuously driven at several spaced points by the sprocket wheels 35 carried on the shafts 34, the conveyor travelling continuously along the tracks 28, 20 and 19 and through most of the soaking tank compartments. In the present instance, the bottles to be cleaned are loaded onto the conveyor near the lower portions of the tracks 19, the loaded bottle conveyor thus passing through most of the soaking tank with a continuous motion. This continuous motion ends in the soaking compartment containing the movable or floating guard 24. The rest of the bottle conveyor, which is a relatively small part of the conveyor, is given an intermittent motion by the pusher bars 48 to carry it past the washing apparatus 14 where the bottles are brushed and rinsed. Between the continuously driven and the intermittently driven portions of the conveyor, there are two regions of slack, one being in the compartment containing the movable guard 24 and the other being between the unloading station 27 and the entrance portions of the conveyor tracks 28. As slack is gradually deposited into the soaking compartment containing the movable guard 24, the guard, by its weight, moves downwardly with the slack, thus guiding the bight of the conveyor and preventing any tendency of the bottles to leave the conveyor. When the slack is taken up during the more rapid intermittent travel of the conveyor, the movable guard 24 correspondingly rises, and the cycle of operation is then repeated. The bottles after passing the washing apparatus are discharged from the conveyor at the unloading station 27, and the empty conveyor then travels back to the loading station by way of the tracks 28 and 20.

While the application of the invention has been exemplified in a bottle cleaning machine, it will be obvious that the invention can be used in any type of machine in which similar conditions are encountered.

What I claim as new and desire to secure by Letters Patent is:

1. In combination, an endless work-carrying conveyor, means for continuously driving a part of said conveyor, means for operating on the work during the continuous travel of the conveyor, means for intermittently driving another part of said conveyor, means for operating on the work in the intermittently travelling part of the conveyor and while said conveyor is intermittently stationary, and means for loading and unloading said conveyor.

2. In combination, an endless bottle conveyor, a soaking tank receiving said conveyor therethrough, means for continuously driving parts of said conveyor within said soaking tank, bottle washing apparatus acting upon the bottles after the soaking operation, said apparatus including brush means having a relative movement with respect to the bottles at an angle to the direction of conveyor travel, and means for intermittently driving that portion of the conveyor travelling past said washing apparatus.

3. In combination, a soaking tank including a compartment, a bottle conveyor including a downwardly extending bight within said compartment, means for continuously driving said conveyor to deposit slack into said compartment, means for intermittently driving a portion of said conveyor beyond said compartment and intermittently taking up the conveyor slack in said compartment, and a movable guard for guiding the bight of said conveyor within said compartment and movable downwardly and upwardly with said bight as slack is deposited and taken up.

4. In combination, a soaking tank including a compartment, a bottle conveyor including a downwardly extending bight within said compartment, means for continuously driving said conveyor to deposit slack into said compartment, means for intermittently driving a portion of said conveyor beyond said compartment and intermittently taking up the conveyor slack in said compartment, and bottle brushing means adjacent the intermittently travelling portion of the conveyor and having a relative movement with respect to the bottles at an angle to the direction of conveyor travel.

5. In combination, a soaking tank including a compartment having opposite side walls, a bottle conveyor including a downwardly extending bight within said compartment, said conveyor including side chains and bottle-receiving carriers therebetween, means for continuously driving said conveyor to deposit slack into said compartment, means for intermittently driving a portion of said conveyor beyond said compartment and intermittently taking up the conveyor slack in said compartment, guide elements secured to the opposite side walls of said compartment, guide members slidably mounted for up and down movement on said guide elements and having lower curved portions forming chain-engaging tracks, and a curved bottle-guiding plate extending between and secured to said slidably mounted guide members to form therewith a movable guard which is displaceable downwardly and upwardly with said conveyor bight as the slack is deposited and taken up.

6. In combination, a soaking tank including a compartment, a bottle conveyor including a downwardly extending bight within said compartment, said conveyor including carriers adapted to receive bottles therein, means for continuously driving said conveyor to deposit slack into said compartment, means for intermittently driving a portion of said conveyor beyond said compartment and intermittently taking up the conveyor slack in said compartment, a guard plate within said compartment for retaining the bottles in said carriers, a curved guard plate at the lower portion of the conveyor bight and having a relatively slidable overlapping connection with said first-named guard plate, and means for movably mounting said curved guard plate to permit its displacement downwardly and upwardly with said conveyor bight as the slack is deposited and taken up.

7. In combination, a soaking tank including a compartment, a bottle conveyor including a downwardly extending bight within said compartment, said conveyor including side chains and bottle-receiving carriers therebetween, means for driving said conveyor to deposit slack into said compartment and to take up slack from said compartment, stationary tracks for guiding the conveyor chains in the side portions of said conveyor bight, movably mounted guide members having lower curved portions forming chain-engaging tracks in continuation of said first-named tracks, and means for movably supporting said guide members for displacement downwardly and upwardly with said conveyor bight as the slack is deposited and taken up.

8. In combination, a soaking tank including a compartment, a bottle conveyor including a downwardly extending bight within said compartment, said conveyor including side chains of the roller type and bottle-receiving carriers therebetween, means for driving said conveyor to deposit slack into said compartment and to take up slack from said compartment, stationary tracks for guiding the chain rollers in the side portions of said conveyor bight, movably mounted guide members having lower curved portions forming chain-roller-engaging tracks in substantial continuation of said first-named tracks, means for movably supporting said guide members for displacement downwardly and upwardly with said conveyor bight as the slack is deposited and taken up, and means for guiding the links of the conveyor chains at regions adjacent the upper ends of the tracks of said guide members.

In testimony whereof, I affix my signature.

GEORGE J. MEYER.